United States Patent [19]

Deckard

[11] Patent Number: 5,639,070
[45] Date of Patent: Jun. 17, 1997

[54] METHOD FOR PRODUCING PARTS BY SELECTIVE SINTERING

[75] Inventor: Carl R. Deckard, Austin, Tex.

[73] Assignee: Board of Regents, The University of Texas System, Austin, Tex.

[21] Appl. No.: 484,125

[22] Filed: Jun. 7, 1995

Related U.S. Application Data

[62] Division of Ser. No. 251,609, May 31, 1994, Pat. No. 5,597,589, which is a continuation of Ser. No. 911,879, Jul. 10, 1992, Pat. No. 5,316,580, which is a division of Ser. No. 541,788, Jun. 21, 1990, Pat. No. 5,132,143, which is a division of Ser. No. 105,316, Oct. 5, 1987, abandoned, which is a continuation-in-part of Ser. No. 920,580, Oct. 17, 1986, Pat. No. 4,863,538.

[51] Int. Cl.$^6$ .............................. B05D 1/03; C04B 35/64; C23C 24/00
[52] U.S. Cl. .......................... 264/497; 264/434; 264/460
[58] Field of Search .................................. 264/497, 434, 264/460, 461, 462

[56] References Cited

U.S. PATENT DOCUMENTS

| | | |
|---|---|---|
| 2,076,952 | 4/1937 | Kratky . |
| 2,435,273 | 2/1948 | Hatfield ........................................ 117/93 |
| 2,599,947 | 6/1952 | Sherman et al. . |
| 2,918,896 | 12/1959 | Uhleen . |
| 2,933,417 | 4/1960 | McIntyre, Jr. ........................... 118/118 |
| 2,961,336 | 11/1960 | Uhleen . |
| 3,063,407 | 11/1962 | Bergstein . |
| 3,243,317 | 3/1966 | Baker . |
| 3,279,424 | 10/1966 | Brown, Jr. et al. . |

(List continued on next page.)

FOREIGN PATENT DOCUMENTS

| | | |
|---|---|---|
| 0173654 | 3/1986 | European Pat. Off. . |
| 0209366 | 1/1987 | European Pat. Off. . |
| 2166526 | 8/1973 | France . |
| 2263777 | 7/1973 | Germany . |
| 2651946 | 6/1977 | Germany . |
| 137951 | 10/1979 | Germany . |
| 53-7383/78 | 3/1978 | Japan . |
| 57-160975 | 10/1982 | Japan . |
| 5945089 | 3/1984 | Japan . |
| 59-76689 | 5/1984 | Japan . |
| 61-52373 | 3/1986 | Japan . |
| 61-091371 | 5/1986 | Japan . |
| 62-21465 | 1/1987 | Japan . |
| 1215184 | 9/1970 | United Kingdom . |
| 1501342 | 2/1978 | United Kingdom . |

OTHER PUBLICATIONS

Daido Tokushuko KK "Forming Oxidation Resistant Layer on Silicon Nitride Body," Jan. 1984, (English Abstract).
Immediate Production of 3–D Objects, Hydronetics, Inc.
Lasers Carve Complex 3–D Parts (pp. 1–11).
Leont'ev, Lazernaja Poverhnostnaja Obrabotka Metallov I Splavov, (1986) pp. 120–123 (partial translation included).

(List continued on next page.)

*Primary Examiner*—Christopher A. Fiorilla
*Attorney, Agent, or Firm*—Anderson, Levine & Lintel

[57] ABSTRACT

A method and apparatus for selectively sintering a layer of powder to produce a part as a plurality of sintered layers. The apparatus includes a computer controlling a laser to direct the laser energy onto the powder to produce a sintered mass. The computer either determines or is programmed with the boundaries of the desired cross-sectional regions of the part. For each cross-section, the aim of the laser beam is scanned over a layer of powder and the beam is switched on to sinter only the powder within the boundaries of the cross-section. Powder is applied and successive layers sintered until a completed part is formed. Preferably, the powder dispensing mechanism includes a drum which is moved horizontally across the target area and counter-rotated to smooth and distribute the powder in an even layer across the target area. A downdraft system provides controlled temperature air flow through the target area to moderate powder temperature during sintering.

9 Claims, 5 Drawing Sheets

5,639,070

Page 2

U.S. PATENT DOCUMENTS

| | | | |
|---|---|---|---|
| 3,312,191 | 4/1967 | Lowe . | |
| 3,816,861 | 6/1974 | Smith et al. | 118/112 |
| 3,911,174 | 10/1975 | Rose . | |
| 3,985,995 | 10/1976 | Brandi et al. . | |
| 4,117,302 | 9/1978 | Earle et al. | 219/121 LM |
| 4,135,902 | 1/1979 | Oehrle | 65/2 |
| 4,247,508 | 1/1981 | Householder | 264/219 |
| 4,270,675 | 6/1981 | Wicks et al. | 222/196 |
| 4,300,474 | 11/1981 | Livsey | 118/641 |
| 4,323,756 | 4/1982 | Brown et al. | 219/121 LF |
| 4,375,441 | 3/1983 | Adams et al. | 264/25 |
| 4,407,646 | 10/1983 | Bricot et al. | 425/174.4 |
| 4,469,529 | 9/1984 | Mimura | 148/1.5 |
| 4,474,861 | 10/1984 | Ecer | 428/614 |
| 4,503,096 | 3/1985 | Specht | 427/359 |
| 4,540,867 | 9/1985 | Ackerman | 219/121 LW |
| 4,575,330 | 3/1986 | Hull | 425/174.4 |
| 4,587,396 | 5/1986 | Rubin | 219/121 LU |
| 4,644,127 | 2/1987 | La Rocca | 219/121 |
| 4,743,733 | 5/1988 | Mehta et al. | 219/121 LF |
| 4,752,352 | 6/1988 | Feygin | 156/630 |
| 4,818,454 | 4/1989 | Urquhart et al. | 26/59 |
| 4,818,562 | 4/1989 | Arcella et al. | 427/53.1 |
| 4,863,538 | 9/1989 | Deckard . | |
| 4,887,623 | 12/1989 | Sugiyama et al. | 118/118 |
| 4,927,992 | 5/1990 | Whitlow et al. | 419/5 |
| 4,938,816 | 7/1990 | Beaman et al. . | |
| 4,944,817 | 7/1990 | Bourell et al. | 156/62.2 |
| 5,017,753 | 5/1991 | Deckard | 219/121.63 |
| 5,053,090 | 10/1991 | Beaman et al. | 156/62.2 |
| 5,076,869 | 12/1991 | Bourell et al. | 156/62.2 |
| 5,132,143 | 7/1992 | Deckard | 427/197 |

OTHER PUBLICATIONS

Fudin, "Sculpting Parts With Light", Machine Design, Mar. 6, 1986.

Deckard, Part Generation by Layerwise Selective Sintering, May 1986.

Takei, et al., "Rhenium Film Preparation by Laser Melting", *J. Appl. Phys.* 51(5) (May 1980), pp. 2903–2908.

Babrauskas, "Development of the Cone Calorimeter—A Bench–Scale Heat Release Rate Apparatus Based on Oxygen Consumption," NBSIR 82-2611 (U.S. Dept. of Commerce, Nov. 1982).

Deckard and Beaman, "Recent Advances in Selective Laser Sintering," 14th Conference on Production Research in Technology (Univ. of Michigan 1987), pp. 447–451.

Deckard and Beaman, "Solid Free–From Fabrication and Selective Powder Sintering," NAMRACIS (1987), pp. 636–640.

Babrauskas, et al., "Ignitability Measurements with the Cone Calorimeter," NBSIR 86,3445 (U.S.Dept. of Commerce, Sep. 1986).

Kazuhiko Mori, "Formation of Carbide Ceramic Particle Dispersed Composite Metallic Layer," May 1987 (English Abstract).

FAST GALVO
POSITION FEEDBACK

D/A #1 OUTPUT

MSB OF DATA WORD

LASER MODULATION
SIGNAL

FLAG

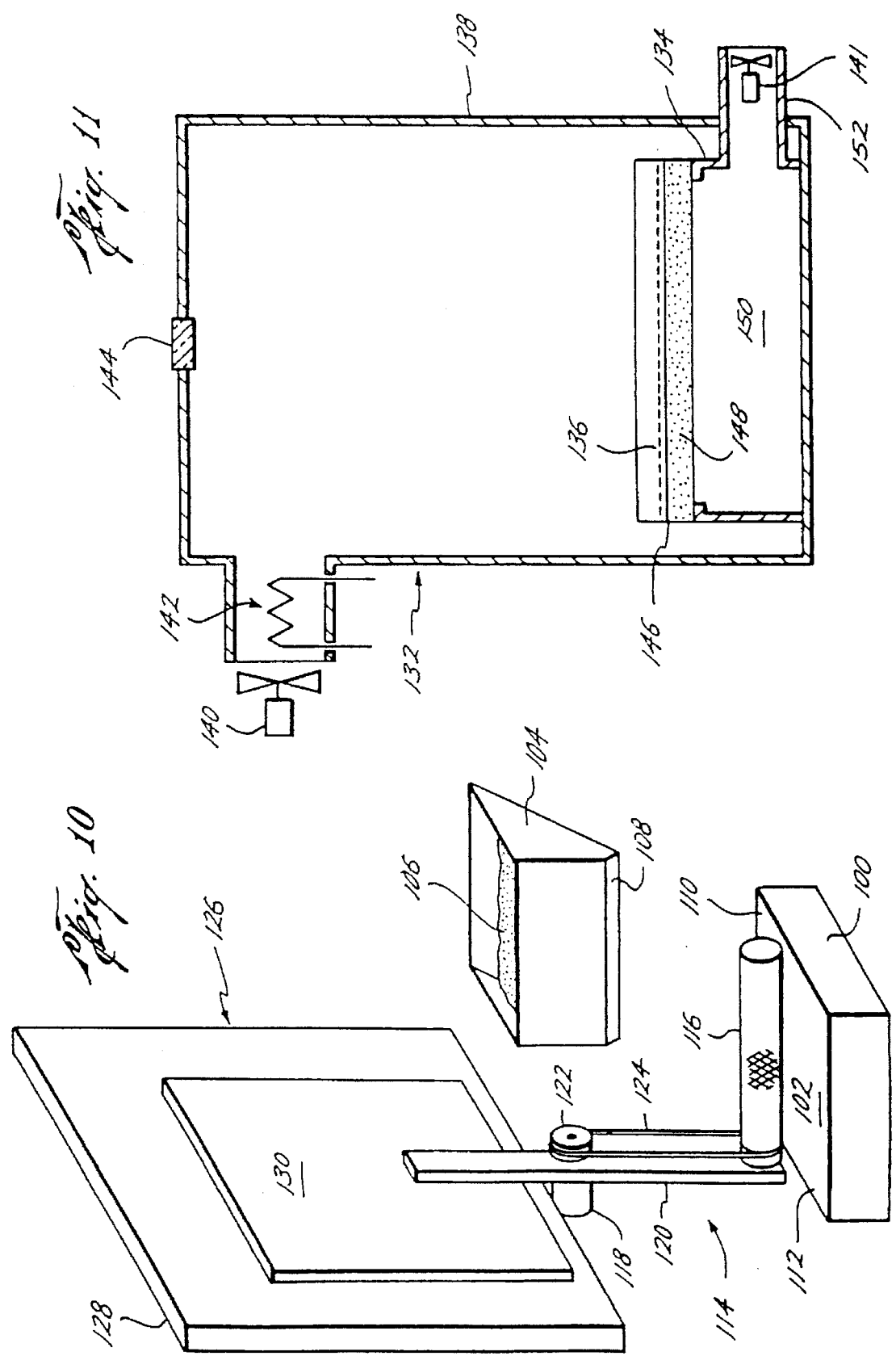

METHOD FOR PRODUCING PARTS BY SELECTIVE SINTERING

The present application is a divisional of application Ser. No. 08/251,609, filed May 31, 1994 now U.S. Pat. No. 5,597,589, which is a continuation of application Ser. No. 07/911,879, filed Jul. 10, 1992, now U.S. Pat. No. 5,316,580, issued May 31, 1994, which is a divisional of application Ser. No. 07/541,788, filed Jun. 21, 1990, now U.S. Pat. No. 5,132,143, issued Jul. 21, 1992, which is a divisional of application Ser. No. 105,316, filed Oct. 5, 1987, now abandoned, which is a continuation-in-part of Ser. No. 06/920,580, filed Oct. 17, 1986 now U.S. Pat. No. 4,863,538.

BACKGROUND OF THE INVENTION

1. Field of the Invention

This invention relates to a method and apparatus which uses a directed energy beam to selectively sinter a powder to produce a part. In particular, this invention relates to a computer aided laser apparatus which sequentially sinters a plurality of powder layers to build the desired part in a layer-by-layer fashion. The present application is particularly directed towards a mechanism for dispensing a layer of powder and a mechanism for directing air flow to the target area to moderate powder temperature.

2. Description of the Relevant Art

The economies associated with conventional part production methods are generally related directly to the quantity of parts to be produced and the desired material characteristics of the finished parts. For example, large scale manufacture casting and extrusion techniques are often cost effective, but these production methods are generally unacceptable for small quantities—i.e. replacement parts or prototype production. Many such conventional part production methods require expensive part specific tooling. Even powder metallurgy requires a die for shaping the powder, making powder metallurgy unattractive as a method for producing a small number of parts.

Where only a small number of parts are desired, conventional production methods involving a subtractive machining method are usually used to produce the desired part. In such substractive methods, material is cut away from a starting block of material to produce a more complex shape. Examples of substractive machine tool methods include: milling, drilling, grinding, lathe cutting, flame cutting, electric discharge machine, etc. While such conventional machine tool substractive methods are usually effective in producing the desired part, they are deficient in many respects.

First, such conventional machine tool substractive methods produce a large amount of waste material for disposal. Further, such machine tool methods usually involve a large initial expense for setting up the proper machining protocol and tools. As such, the set-up time is not only expensive, but relies a great deal on human judgment and expertise. These problems are, of course, exacerbated when only a small number of parts are to be produced.

Another difficulty associated with such conventional machining techniques involves tool wear—which not only involves the cost of replacement, but also reduces machining accuracy as the tool wears. Another limit on the accuracy and tolerance of any part produced by conventional machining techniques is the tolerance limits inherent in the particular machine tool. For example, in a conventional milling machine or lathe, the lead screws and ways are manufactured to a certain tolerance, which limits the tolerances obtainable in manufacturing a part on the machine tool. Of course, the tolerances attainable are reduced with age of the machine tool.

The final difficulty associated with such conventional machine tool subtractive processes is the difficulty or impossibility of making many part configurations. That is, conventional machining methods are usually best suited for producing symmetrical parts and parts where only the exterior part is machined. However, where a desired part is unusual in shape or has internal features, the machining becomes more difficult and quite often, the part must be divided into segments for production. In many cases, a particular part configuration is not possible because of the limitations imposed upon the tool placement on the part. Thus, the size and configuration of the cutting tool do not permit access of the tool to produce the desired configuration.

There are other machining processes which are additive, for example, plating, cladding, and some welding processes are additive in that material is added to a starting substrate. In recent years, other additive-type machining methods have been developed which use a laser beam to coat or deposit material on a starting article. Examples include U.S. Pat. Nos. 4,117,302; 4,474,861; 4,300,474; and 4,323,756. These recent uses of lasers have been primarily limited to adding a coating to a previously machined article. Often such laser coating methods have been employed to achieve certain metallurgic properties obtainable only by such coating methods. Typically, in such laser coating methods the starting article is rotated and the laser directed at a fixed location with the coating material sprayed onto the article so that the laser will melt the coating onto the article.

SUMMARY OF THE INVENTION

The problems outlined above are in large major solved by the method and apparatus of the present invention. The present invention includes a directed energy beam—such as a laser—and is adaptable to produce almost any three dimensional part. The method of the present invention is an additive process, with the powder being dispensed into a target area where the laser selectively sinters the powder to produce a sintered layer. The invention is a layer-wise process in which the layers are joined together until the completed part is formed. The method of the present invention is not limited to a particular type of powder, but rather is adaptable to plastic, metal, polymer, ceramic powders, or composite materials.

Broadly speaking, the apparatus includes a laser or other directed energy source which is selectable for emitting a beam in a target area where the part is produced. A powder dispenser system deposits powder into the target area. A laser control mechanism operates to move the aim of the laser beam and modulates the laser to selectively sinter a layer of powder dispensed into the target area. The control mechanism operates to selectively sinter only the powder disposed within defined boundaries to produce the desired layer of the part. The control mechanism operates the laser to selectively sinter sequential layers of powder, producing a completed part comprising a plurality of layers sintered together. The defined boundaries of each layer correspond to respective cross-sectional regions of the part. Preferably, the control mechanism includes a computer—e.g. a CAD/CAM system—to determine the defined boundaries for each layer. That is, given the overall dimensions and configuration of the part, the computer determines the defined boundaries for each layer and operates the laser control mechanism in accordance with the defined boundaries. Alternatively, the computer can be initially programmed with the defined boundaries of each layer.

In a preferred form, the laser control mechanism includes a mechanism for directing the laser beam in the target area and a mechanism for modulating the laser beam on and off to selectively sinter the powder in the target area. In one embodiment, the directing mechanism operates to move the aim of the laser beam in a continuous raster scan of target area. The modulating mechanism turns the laser beam on and off so that the powder is sintered only when the aim of the laser beam is within the defined boundaries for the particular layer. Alternatively, the directing mechanism aims the laser beam only within the defined boundaries for the particular layer so that the laser beam can be left on continuously to sinter the powder within the defined boundaries for the particular layer.

In a preferred embodiment, the directing mechanism moves the laser beam in a repetitive raster scan of the target area using a pair of mirrors driven by galvonometers. The first mirror reflects the laser beam to the second mirror which reflects the beam into the target area. Shifting movement of the first mirror by its galvonometer shifts the laser beam generally in one direction in the target area. Similarly, shifting movement of the second mirror by its galvonometer shifts the laser beam in the target area in a second direction. Preferably, the mirrors are oriented relative to each other so that the first and second directions are generally perpendicular to each other. Such an arrangement allows for many different types of scanning patterns of the laser beam in the target area, including the raster scan pattern of the preferred embodiment of the present invention.

The method of part production of the present invention includes the steps of depositing a first portion of powder onto a target surface, scanning the aim of a directed energy beam (preferably a laser) over the target surface, and sintering a first layer of the first powder portion on the target surface. The first layer corresponds to a first cross-sectional region of the part. The powder is sintered by operating the directed energy source when the aim of the beam is within the boundaries defining the first layers. A second portion of powder is deposited onto the first sintered layer and the aim of the laser beam scanned over the first sintered layer. A second layer of the second powdered portion is sintered by operating the directed energy source when the aim of the beam is within the boundaries defining the second layer. Sintering of the second layer also joins the first and second layers into a cohesive mass. Successive portions of powder are deposited onto the previously sintered layers, each layer being sintered in turn. In one embodiment, the powder is deposited continuously into the target.

In a preferred embodiment, the laser beam is modulated on and off during the raster scan so that the powder is sintered when the aim of the beam is directed within the boundaries of the particular layer. Preferably, the laser is controlled by a computer; the computer may include a CAD/CAM system, where the computer is given the overall dimensions and configuration of the part to be made and the computer determines the boundaries of each cross-sectional region of the part. Using the determined boundaries, the computer controls the sintering of each layer corresponding to the cross-sectional regions of the part. In an alternative embodiment, the computer is simply programmed with the boundaries of each cross-sectional region of the part.

Additionally, another embodiment of the present invention includes a device for distributing the powder as a layer over the target area or region. Preferably, the distributing device includes a drum, a mechanism for moving the drum across the region, and a mechanism for counter-rotating the drum as it is moved across the region. The drum moving mechanism preferably keeps the drum a desired spacing above the region to yield a layer of powder of a desired thickness. The drum is operable when counter-rotated and moved across the region to project powder forward in the direction of movement, leaving behind a layer of powder having the desired thickness.

In still another embodiment, a downdraft mechanism for controlling temperature of the powder is provided which includes a support defining the target area, a mechanism for directing air to the target area, and a mechanism for controlling the temperature of the air prior to reaching the target area. The support preferably includes porous medium on which the powder is deposited and a plenum adjacent the porous medium. Thus, the controlled temperature air is directed to the powder in the target area and helps control the temperature of the sintered and unsintered powder in the target area.

As can be appreciated from the above general description, the method and apparatus of the present invention solves many of the problems associated with known part production methods. First, the present invention is well suited for prototype part production or replacement part production of limited quantities. Further, the method and apparatus hereof are capable of making parts of complex configurations unobtainable by conventional production methods. Further, the present invention eliminates tool wear and machine design as limiting factors on the tolerances obtainable in producing the part. Finally, with the apparatus of the present invention incorporated into a CAD/CAM environment, a large number of replacement parts can be programmed into the computer and can be easily produced with little set-up or human intervention.

BRIEF DESCRIPTION OF THE DRAWINGS

FIG. 10 is a schematic, perspective view of the powder dispensing device of the present invention; and FIG. 11 is an apparatus for moderating the temperature of the powder in accordance with the present invention.

DESCRIPTION OF THE PREFERRED EMBODIMENTS

Figure 1:
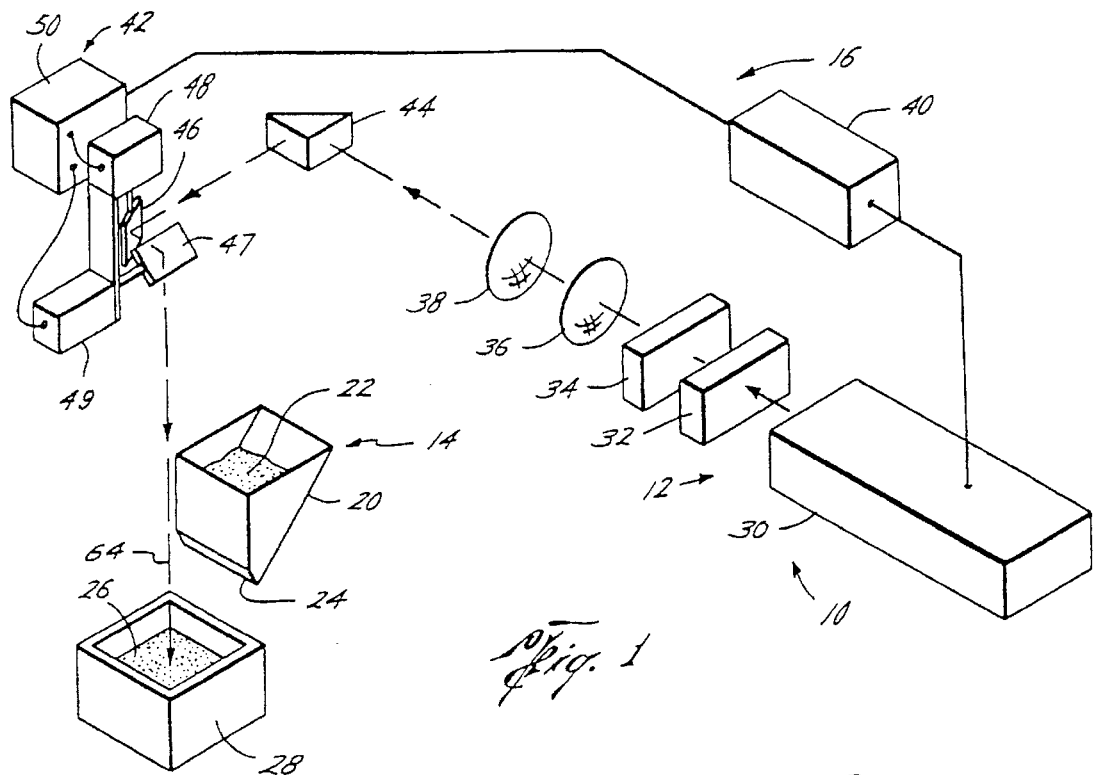
FIG. 1 is a schematic representation of the apparatus of the present invention.

Turning now to the drawings, FIG. 1 broadly illustrates the apparatus 10 in accordance with the present invention. Broadly speaking, the apparatus 10 includes a laser 12, powder dispenser 14, and laser control means 16. In more detail, the powder dispenser 14 includes a hopper 20 for receiving the powder 22 and having an outlet 24. The outlet 24 is oriented for dispensing the powder to a target area 26, which in FIG. 1 is generally defined by the confinement structure 28. Of course, many alternatives exist for dispensing the powder 22.

The components of the laser 12 are shown somewhat schematically in FIG. 1 and include a laser head 30, a safety shutter 32, and a front mirror assembly 34. The type of laser used is dependent upon many factors, and in particular upon the type of powder 22 that is to be sintered. In the embodiment of FIG. 1, a Nd:YAG laser (Lasermetrics 9500Q) was used which can operate in a continuous or pulsed mode with a hundred-watt maximum outlet power in the continuous mode. The laser beam output of the laser 12 has a wavelength of approximately 1060 nM, which is near infrared. The laser 12 illustrated in FIG. 1 includes an internal pulse rate generator with a selectable range of about one kilohertz to forty kilohertz, and an approximately six nanosecond pulse duration. In either the pulsed or continuous mode, the laser 12 can be modulated on or off to selectively produce a laser beam which travels generally along the path shown by the arrows in FIG. 1.

To focus the laser beam, a diverging lens 36 and converging lens 38 are disposed along the path of travel of the laser beam as shown in FIG. 1. Using just the converging lens 38, the location of the true focal point is not easily controlled by varying the distance between the converging lens 38 and the laser 12. The diverging lens 36 placed between the laser 12 and convening lens 38 creates a virtual focal point between the diverging lens 36 and the laser 12. Varying the distance between the converging lens 38 and the virtual vocal point, allows control of the true focal point along the laser beam path of travel on the side of the converging lens 38 remote from the laser 12. In recent years there have been many advances in the field of optics, and it is recognized that many alternatives are available to efficiently focus the laser beam at a known location.

In more detail, the laser control means 16 includes computer 40 and scanning system 42. In a preferred embodiment, the computer 40 includes a microprocessor for controlling the laser 12 and a CAD/CAM system for generating the data. In the embodiment illustrated in FIG. 1, a personal computer is used (Commodore 64) whose primary attributes include an accessible interface port and a flag line which generates a nonmaskable interrupt.

As shown in FIG. 1, the scanning system 42 includes a prism 44 for redirecting the path of travel of the laser beam. Of course, physical layout of the apparatus 10 is the primary consideration in determining whether a prism 44, or a plurality of prisms 44, are needed to manipulate the path of travel of the laser beam. The scanning system 42 also includes a pair of mirrors 46, 47 driven by respective galvonometers 48, 49. The galvonometers 48, 49 coupled to their respective mirrors 46, 47 to selectively orientate the mirrors 46, 47. The galvonometers 46, 47 are mounted perpendicular to each other such that the mirrors 46, 47 are mounted nominally at a right angle to each other. A function generator driver 50 controls the movement of the galvonometer 48 (galvonometer 49 is slaved to the movement of galvonometer 48) so that the aim of the laser beam (represented by the arrows in FIG. 1) can be controlled in the target area 26. The driver 50 is operatively coupled to the computer 40 as shown in FIG. 1. It will be appreciated that alternative scanning methods are available for use as the scanning system 42, including acusto-optic scanners, rotating polygon mirrors, and resonant mirror scanners.

Figure 2:
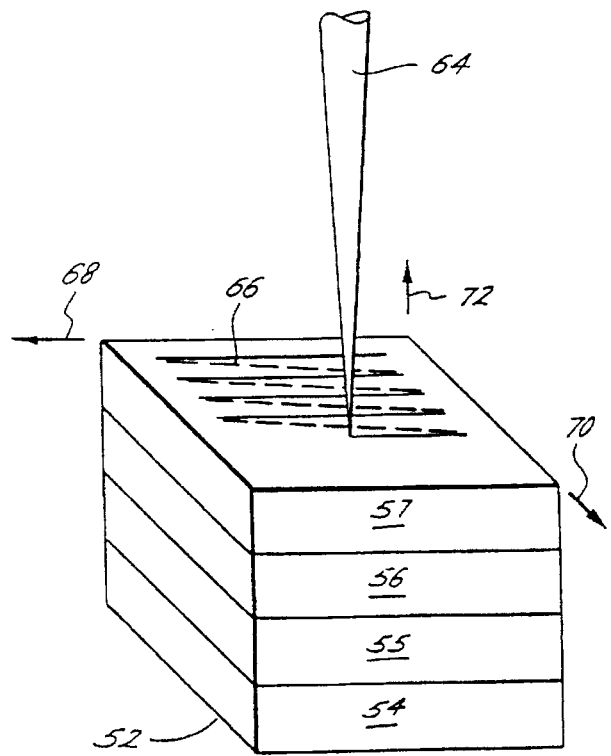
FIG. 2 is a schematic showing a portion of the layered build up of a part produced in accordance with the present invention, and illustrating the raster scan pattern of the laser beam in the target area.

Turning to FIG. 2 of the drawing, a portion of a part 52 is schematically illustrated and-shows four layers 54–57. The aim of the laser beam, labeled 64 in FIG. 2, is directed in a raster scan pattern as at 66. As used herein, "aim" is used as a neutral term indicating direction, but does not imply the modulation state of the laser 12. For convenience, the axis 68 is considered the fast scan axis, while the axis 70 is referred to as the slow scan axis. Axis 72 is the direction of part build-up.

Figure 9:
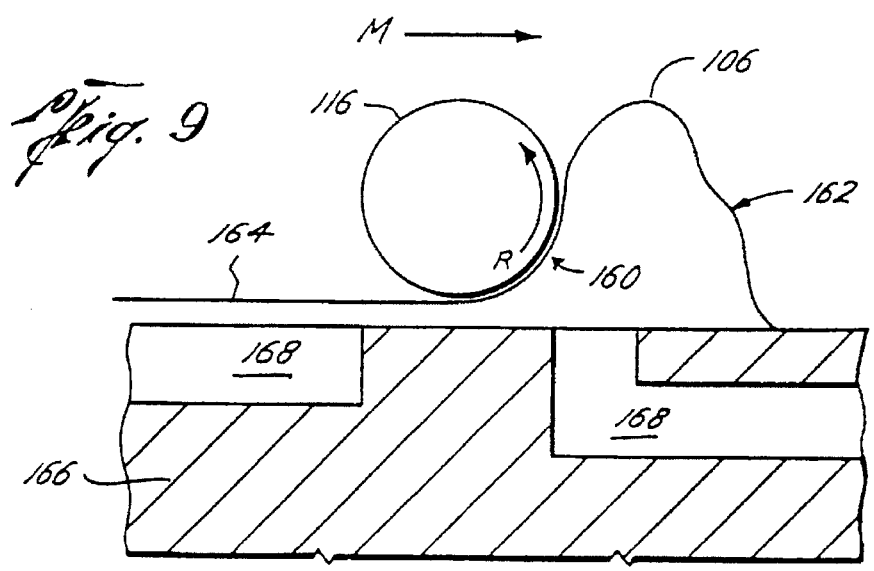
FIG. 9 is a schematic, vertical, sectional view of the powder dispensing device of the present invention distributing powder in a layer on the part being produced.

Turning to FIGS. 9 and 10, an alternative form of powder dispenser 20 is illustrated. Broadly speaking, a support defines a target area 102 where the aim of the beam 64 is directed (see FIG. 1). A hopper 104 dispenses the powder 106 through opening 108 into the target area 102. A metering roller (not shown) is disposed in the opening 108, such that when rotated the metering roller deposits a metered mound of powder in a line at end 110 of the target area 102.

A leveling mechanism 114 spreads the mound of powder 106 from end 110 to the other end 112 of the target area. The leveling mechanism 114 includes a cylindrical drum 116 having an outer knurled surface. A motor 118 mounted on bar 120 is coupled to the drum 116 via pulley 122 and belt 124 to rotate the drum.

The leveling mechanism 114 also includes a mechanism 126 for moving the drum 116 between end 110 and end 112 of the target area. The mechanism 126 comprises an X/Y table for moving the bar 120 horizontally and vertically. That is, table 128 is fixed while plate 130 is selectively moveable relative to plate 130.

Still another embodiment is shown in FIG. 11 for controlling the temperature of the article being produced. Undesirable shrinkage of the article being produced has been observed to occur due to differences between the temperature of the particles not yet scanned by the directed energy beam and the temperature of the previously scanned layer. It has been found that a downward flow of controlled-temperature air through the target area is able to moderate such undesirable temperature differences. The controlled-temperature air downdraft system 132 of FIG. 11 reduces thermal shrinkage by providing heat transfer between the controlled-temperature air and the top layer of powder particles to be sintered. This heat transfer moderates the temperature of a the top layer of particles to be sintered, controls the mean temperature of the top layer, and removes bulk heat from the article being produced, thereby reducing its bulk temperature preventing the article from growing into the unsintered material. The temperature of the incoming air is adjusted to be above the softening point of the powder, but below the temperature at which significant sintering will occur.

The downdraft system 132 broadly includes a support 134 defining target area 136, means for directing air to the target area, and a mechanism for controlling the temperature of the incoming air, such as resistance heater 142. The air directing means includes chamber 138 surrounding support 134, fan 140 and/or vacuum 141. A window 144 admits the aim of the beam 64 (FIG. 1) to the target area 136. A powder dispensing mechanism (not shown), such as illustrated in FIGS. 1 or 10 is disposed at least partially in the chamber 138 to dispense powder onto target area 136.

Support 134 preferably comprises a filter medium 146 (such as a small-pore paper) on top of a honey-comb porous medium 148. A plenum 150 is disposed for gathering air for passage to outlet 152. Of course, the outlet 152 is connected to vacuum 141 or other air handling mechanism.

Operation

A fundamental concept of the present invention is the build up of a part in a layer-by-layer manner. That is, a part is considered a plurality of discrete cross-sectional regions which cumulatively comprise the three-dimensional configuration of the part. Each discrete cross-sectional region has defined two-dimensional boundaries—of course each region may have unique boundaries. Preferably, the thickness (dimension in the axis 72 direction) of each layer is constant.

In the method, a first portion of powder 22 is deposited in the target area 26 and selectively sintered by the laser beam 64 to produce a first sintered layer 54 (FIG. 2). The first sintered layer 54 corresponds to a first cross-sectional region of the desired part. The laser beam selectively sinters only the deposited powder 22 within the confines of the defined boundaries.

There are, of course, alternative methods of selectively sintering the powder 22. One method is for the aim of the beam to be directed in a "vector" fashion—that is, the beam would actually trace the outline and interior of each cross-sectional region of the desired part. Alternatively, the aim of the beam 64 is scanned in a repetitive pattern and the laser 12 modulated. In FIG. 2, a raster scan pattern 66 is used and is advantageous over the vector mode primarily in its simplicity of implementation. Another possibility is to combine the vector and raster scan methods so that the desired boundaries of the layer are traced in a vector mode and the interior irradiated in a raster scan mode. There are, of course, trade-offs associated with the method chosen. For example, the raster mode has a disadvantage when compared to the vector mode in that arcs and lines which are not parallel to the axes 68, 70 of the raster pattern 66 of the laser beam 64 are only approximated. Thus, in some cases resolution of the part can be degraded when produced in the raster pattern mode. However, the raster mode is advantageous over the vector mode in the simplicity of implementation.

Turning to FIG. 1, the aim of the laser beam 64 is scanned in the target area 26 in a continuous raster pattern. Broadly speaking, the driver 50 controls galvonometers 48, 49 to made the raster pattern 66 (see FIG. 2). Shifting movement of the mirror 46 controls movement of the aim of the laser beam 64 in the fast scan axis 68 (FIG. 2), while movement of the mirror 47 controls movement of the aim of the laser beam 64 in the slow scan access 70.

Figure 3:
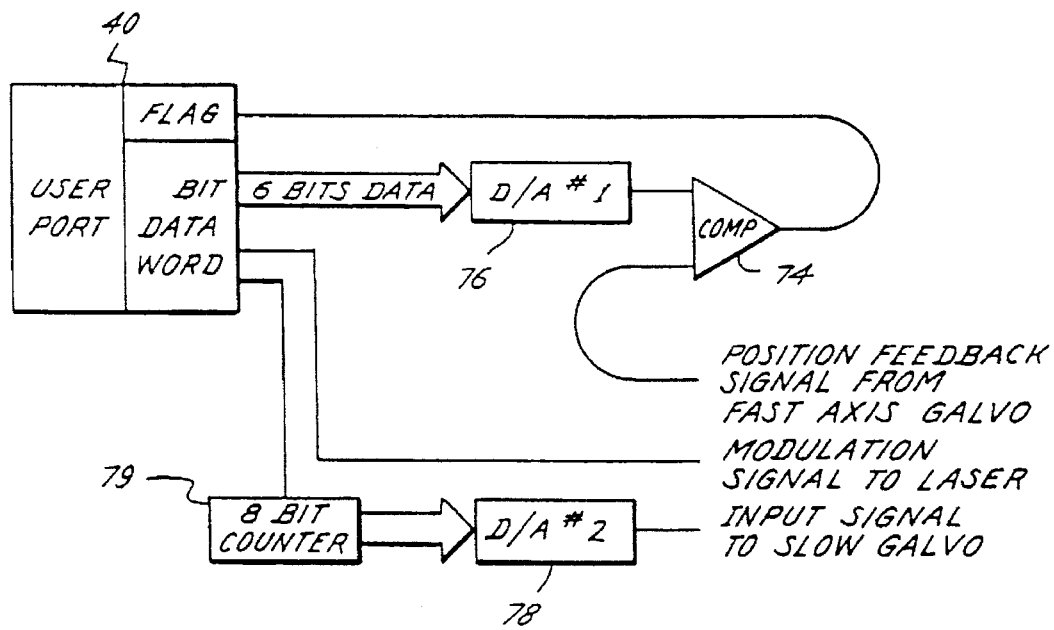
FIG. 3 is a block diagram depicting the interface hardware between the computer, laser and galvonometers of the present invention.

The present position of the aim of the beam 64 is fed back through the driver 50 to the computer 40 (see FIG. 3). As described below, in more detail, the computer 40 possesses information relating to the desired cross-sectional region of the part then being produced. That is, a portion of loose powder 22 is dispensed into the target area 26 and the aim of the laser beam 64 moved in its continuous raster pattern. The computer 40 modulates the laser 12 to selectively produce a laser beam at desired intervals in the raster pattern 66. In this fashion, the directed beam of the laser 12 selectively sinters the powder 22 in the target area 26 to produce the desired sintered layer with the defined boundaries of the desired cross-sectional region. This process is repeated layer-by-layer with the individual layers sintered together to produce a cohesive part—e.g. part 52 of FIG. 2.

Because of the relatively low output power of the laser head 30 illustrated in FIG. 1, the powder 22 consisted of a plastic material (e.g. ABS), based on the lower heat of fusion of most plastics, which is compatible with the lower power laser. Several post formation treatments are contemplated for the parts produced by the apparatus 10 of the present invention. For example, if such a produced part is to be used only as a prototype model or as a die for sandcast or lost wax casting, then post-formation treatment may not be necessary. In some situations, certain surfaces of the parts produced may be designed for close tolerances, in which case some post-fabrication machining would be accomplished. Alternatively, some types of parts may require certain material properties which can be achieved by heat-treating and/or chemically treating the part. For example, the granule size of the powder 22 could be such to produce a part having an open porosity and epoxy or similar substance injected into the part could achieve the desired material properties—e.g. compression strength, abrasion resistance, homogeneity, etc.

Several characteristics of powder 22 have been identified which improve performance. First, energy absorption by the powder can be controlled by the addition of a dye such as carbon black. Adjusting the concentration and composition of the additive controls the absorbtivity constant K of the powder. Generally, energy absorptivity is governed by the exponential decay relation:

$$I(z)=I_o \exp(K Z)$$

where I(z) is the optical intensity (powder per unit area) in the powder at a distance z normal to the surface, $I_o$ is the surface value of I (intensity at the surface), and K is the absorptivity constant. Adjustment of the absorptivity constant K and adjustment of the layer thickness in which a given fraction of beam energy is absorbed gives overall control of the energy absorbed in the process.

Another important characteristics of the powder is the aspect ratio of the particles (i.e. ratio of the particle's maximum dimension to its minimum dimension). That is, particles with certain aspect ratios tend to warp during shrinkage of the part. With particles having low aspect ratios, i.e. nearly spherical, part shrinkage is more three dimensional, resulting in greater warp. When particles with high aspect ratios are used (e.g. flakes or rods) shrinkage primarily is in a vertical direction reducing or eliminating warping of the part. It is believed that high aspect ratio particles have greater freedom to accommodate bonding and interparticle contact is preferentially oriented in horizontal planes causing shrinkage to occur primarily in a vertical direction.

Turning now to FIGS. 9 and 10, the dispensing mechanism 114 has been found to provide a controlled level layer of powder in the target area 102 without disturbing the part being produced. A metered amount of powder 106 is deposited at end 110 of the target area 102. The drum 116 is spaced away from end 110 when the powder 106 is dispensed. In the system illustrated in FIG. 10, the plate 130 and bar 120 (and attached mechanisms) are raised vertically after the powder is dispensed in the mound. Travel of the plate 130 towards the hopper 104 brings the drum 116 into position adjacent the mound of powder lined up along end 110. The drum 116 is lowered to contact the mound of powder and brought horizontally across the target area 102 to spread the mound of powder in a smooth even layer. Of course, the precise location of plate 130 relative to table 128 can be controlled, so that the spacing between drum 116 and target area 102 can be precisely controlled to yield the desired thickness to the layer of powder. Preferably, the spacing between the drum 116 and target area 102 is constant to give a parallel motion, but other spacing options are available.

As the drum 116 is moved horizontally across the target area 102 from end 110 to end 112, motor 118 is activated to counter-rotate the drum 116. As shown in FIG. 9, "counter-rotation" means the drum 116 is rotated in the direction R counter to the direction of movement M of the drum 116 horizontally across the target area 102.

In more detail (FIG. 9), the drum 116 is counter-rotated at high speed to contact the mound of powder 106 along the trailing edge 160. The mechanical action of the drum on the powder ejects the powder to the direction of movement M so that the ejected particles fall in the region of the leading edge of the powder 162. As illustrated in FIG. 9, a smooth, level layer of powder is left behind the drum 116 (between drum 116 and end 110) as depicted at 164.

FIG. 9 also illustrates schematically that the powder 106 can be distributed over the target area without disturbing previously sintered powder 166 or unsintered powder 168. That is, the drum 116 is moved across the target area 102 without transmitting shear stress to the previously built up layers and without disturbing the article as it is being produced. The absence of such sheer stress permits a smooth layer of powder 106 to be distributed on the fragile substrate in the target area, which includes both the sintered particles 166 and the unsintered particles 168.

Interface and Software

The interface hardware operatively interconnects the computer 40 with the laser 12 and galvonometers 47, 48. The output port of the computer 40 (see FIGS. 1 and 3) is directly connected to the laser 12 to selectively modulate the laser 12. When operated in the pulsed mode, the laser 12 is easily controlled by digital inputs to the pulsed gate input of the laser. Galvonometer 48 is driven by the function generator driver 50 to drive the beam in the fast scan axis 68 independent of any control signals from the computer 40. However, a position feedback signal from the galvonometer 48 is fed to a voltage comparator 74 as shown in FIG. 3. The other input to the comparator is connected to the digital-to-analog convertor 76 which is indicative of the least significant six bits (bits 0–5) of the user port of the computer 40. As shown in FIG. 3, the output of the voltage comparator 74 is connected to the flag line on the user port of the computer 40. When the voltage comparator determines that the feedback signal from the galvonometer 48 crosses the signal from the digital-to-analog convertor 76, the flag line goes low causing a nonmaskable interrupt. As discussed below, the nonmaskable interrupt causes the next byte of data to put out on the user port of a computer 40.

Finally, as shown in FIG. 3, the galvonometer 49 driving the aim of the laser beam 64 in the slow scan axis 70, is controlled by a second digital to analog convertor 78. The digital-to-analog convertor 78 is driven by a counter 79 which increments with each sweep of the aim of the beam 64 in the fast scan axis 68. The eight byte counter is designed to overflow after 256 scans in the fast scan axis 68 to start a new cycle or raster scan pattern 66.

Preferably, the control information (i.e. defined boundaries of the cross-sectional regions) data for each raster pattern 66 would be determined by a CAD system given the overall dimensions and configuration of the part to be produced. Whether programmed or derived, the control information data for each raster pattern 66 is stored in the computer memory as a series of eight bit words. The data format represents a pattern of "on" and "off" regions of the laser 12, versus distance along the raster pattern 66 traveled by the aim of the beam 64. The data is stored in a "toggle-point" format where the data represents the distance along each raster scan pattern 66 where the laser is modulated (i.e. turned from on to off or from off to on). Although a "bit map" format might be used, the toggle point format has been found more efficient for the production of high resolution parts.

For each eight bit word, the least significant six bits (bits 0–5) represent the location of the next toggle point—i.e. the next location for modulation of the laser 12. The next bit (bit 6) represents whether the laser is on or off immediately before the toggle point identified in the least significant six bits. The most significant bit (MSB or bit 7) is used for looping and for controlling the slow scan axis 70 of the aim of the beam 64. Because the Commodore 64 had limited memory, looping was required —it being understood that a computer 40 with more memory would not require looping.

Figure 6:
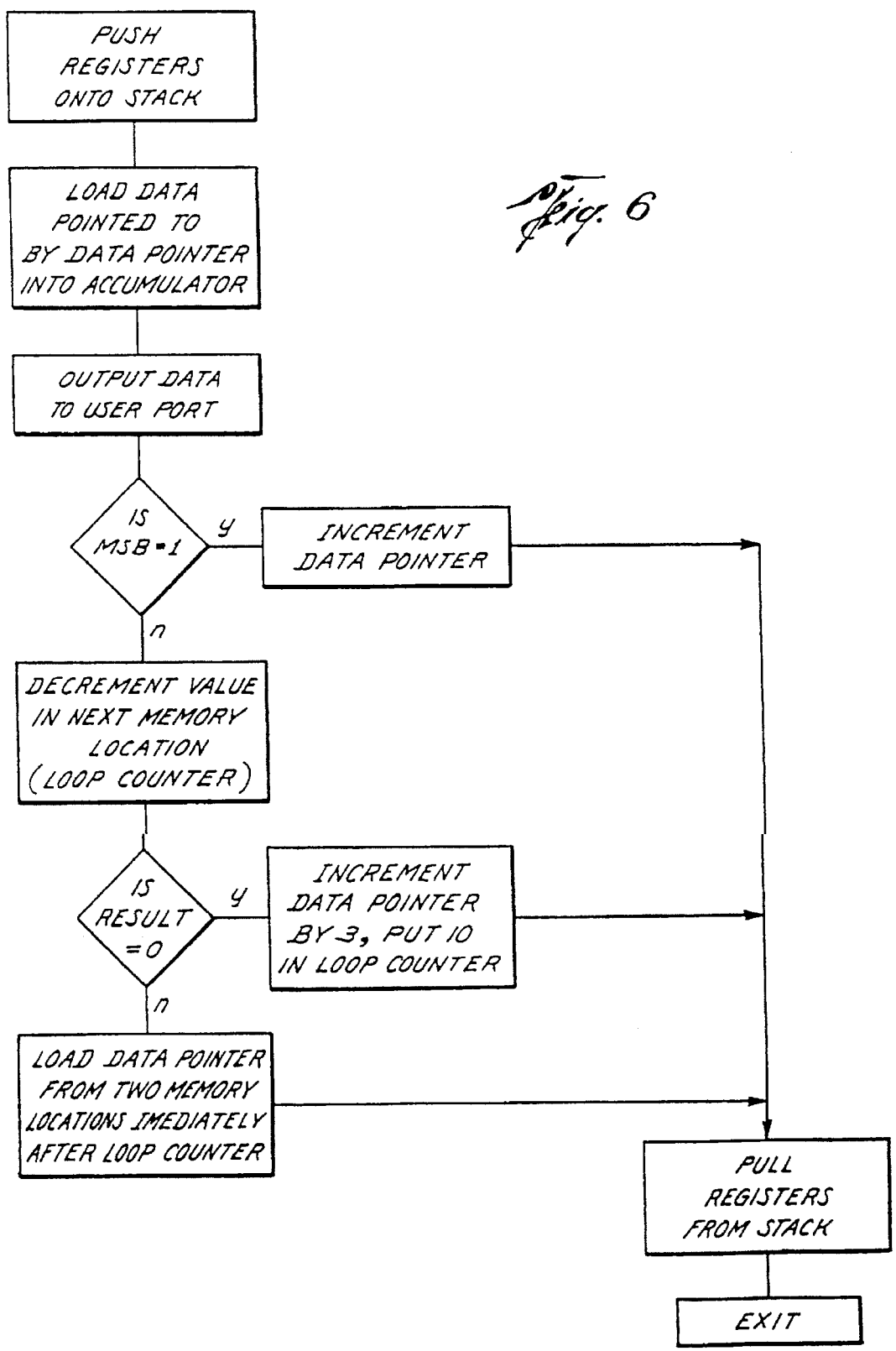
FIG. 6 is a flow chart of the data metering program in accordance with the present invention.

FIG. 6 represents the flow chart for the data metering program. The data metering program is run whenever the flagline goes low causing a non-maskable interrupt (see FIG. 3). The interrupt causes the microprocessor of the computer 40 to retrieve a two byte interrupt vector which points to the location in memory where program control is transferred at interrupt. As shown in FIG. 6, the data metering program first pushes the registers onto the stack and then loads the next byte of data into the accumulator. The data word is also output to the user port with the sixth bit used to modulate the laser 12 (FIG. 3).

As shown in FIG. 6, the most significant bit (MSB or bit 7) of the data word in the accumulator is examined. If the value of the most significant bit is one, that means the end of the loop has not been reached; therefore the data pointer is incremented, registers are restored from the stack, and the data metering program is exited, returning control to the microprocessor at the location of interrupt. If the most significant bit in the accumulator is zero, the data word is the last word in the loop. If the data word is the last word in the loop, the next bit in memory is a loop counter and the following two bytes are a vector pointing to the top of the loop. As can be seen from FIG. 6, if the most significant bit equals zero (end of the loop) the loop counter (next bit) is decremented and analyzed. If the loop counter is still greater than zero, the data pointer assumes the value from the next two memory bytes after the loop counter, registers are pulled from the stack and program control returns to the location of interrupt. On the other hand, if loop counter is zero, the data pointer is incremented by three and the loop counter is reset to ten before exiting the program. It can be appreciated that the need for such looping is absolved if the memory size of the computer 40 is adequate.

EXAMPLE

Figure 4:
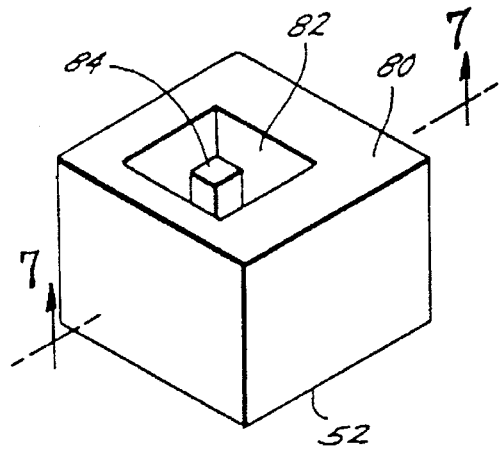
FIG. 4 is a perspective view of an example part produced in accordance with the present invention.
Figure 5:
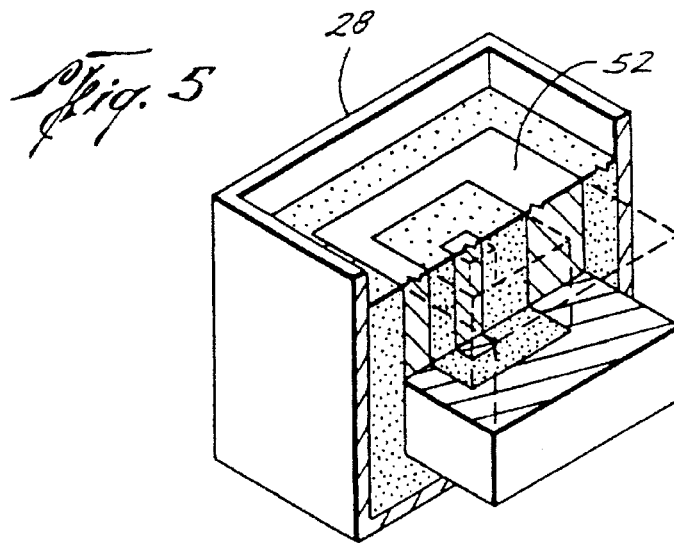
FIG. 5 is a sectional view with parts broken away and in phantom, of the part illustrated in FIG. 4.

In FIGS. 4 and 5, an example part 52 is illustrated. As can be seen from the drawing, the example part 52 assumes an unusual shape in that it is not symmetrical and would be difficult to fabricate using conventional machining methods. For reference purposes, the part 52 includes an outer base structure 80 having an interior cavity 82 and a pillar 84 disposed within the cavity 82 (see FIG. 4). FIG. 5 shows the part 52 within the confinement structure 28 defining the target area 26 illustrated in FIG. 1. As shown in FIG. 5, some of the powder 22 is loose, while the remainder of the powder is selectively sintered to comprise the structure of the part 52. FIG. 5 is shown in vertical section with parts broken away and outlined in phantom to show the sintered cohesive portions of the part 52.

Figure 7:
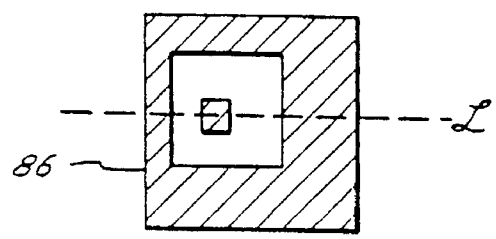
FIG. 7 is a sectional view taken along line 7—7 of FIG. 4.

FIG. 7 shows a horizontal cross-sectional region, taken along line 7—7 of FIG. 4. FIG. 7 represents a discrete layer 86 associated with the cross-sectional region of the part being produced. As such, the sintered layer 86 of FIG. 7 is a product of a single raster pattern 66 as illustrated in FIG. 2.

Figure 8:
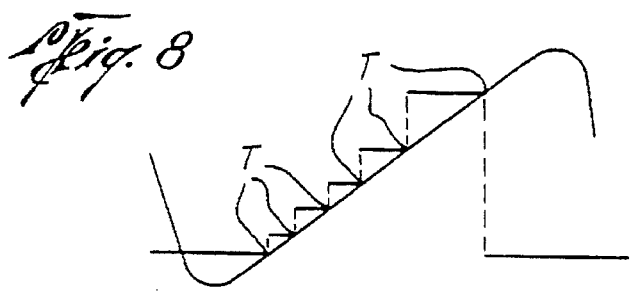
FIG. 8 illustrates in diagram form the correlation between a single sweep of the laser across the layer of FIG. 7 and the control signals of the present invention.

For reference purposes, a sweep line through the sintered layer 86 has been labeled "L." FIG. 8 illustrates the software and hardware interface operation during the sweep L. The top graph shows the position of feedback signal from the fast axis galvo 48 and the output signal of the first digital to analog convertor 76 (compare FIG. 3). The voltage comparator 74 generates an output signal to the flag line of the computer 40 every time the feedback signal and first D/A output signal cross.

In the top graph of FIG. 8, these points are labeled T to represent toggle points. As can be seen from the bottom graph of FIG. 8, the flag line generates a nonmaskable interrupt corresponding to each toggle point T. The sixth bit of each data word is analyzed and the current state of the laser 12 will reflect the value. The penultimate graph of FIG. 8 shows the laser modulation signal for the sweep line L of FIG. 7. The second graph of FIG. 8 shows that a high-going edge in the most significant bit will be encountered at the end of each sweep of the aim of the laser beam 64 in the fast scan axis 68. As shown in FIGS. 3 and 6, the counter 79 increments on a high going edge, and outputs a signal to the second digital-analog convertor 78 to drive the slow axis galvonometer 49.

As can be seen from the example illustrated in the drawing, parts of complex shape can be produced with relative ease. Those skilled in the art will appreciate that the part 52 illustrated in FIG. 4 would be difficult to produce using conventional machining methods. In particular, machine tool access would make the fabrication of cavity 82 and pillar 84 difficult, if not impossible, to produce if the part 52 were of a relatively small size.

In addition to avoiding the access problem, it will be appreciated that the production accuracy is not dependent upon machine tool wear and the accuracy of mechanical components found in conventional machine tools. That is, the accuracy and tolerances of the parts produced by the method and apparatus of the present invention are primarily a function of the quality of the electronics, the optics, and the implementing software. Of course, heat transfer and material considerations do affect the tolerances obtainable.

Those skilled in the art will appreciate that conventional machining techniques require considerable human intervention and judgment. For example, a conventional machining process, such as milling, would require creativity to make such decisions as tool selection, part segmenting, sequence of cuts, etc. Such decisions would even be more important when producing a control tape for a tape control milling machine. On the other hand, the apparatus of the present invention only requires the data relating to each cross-sectional region of the part being produced. While such data can be simply programmed into the computer 40, preferably, the computer 40 includes a CAD/CAM system. That is, the CAD/CAM portion of the computer 40 is given the overall dimensions and configurations of the desired part to be produced and the computer 40 determines the boundaries for each discrete cross-sectional region of the part. Thus, a vast inventory of part information can be stored and fed to the computer 40 on a selectable basis. The apparatus 10 produces a selected part without set-up time, part specific tooling, or human intervention. Even the complex and expensive dies associated with powder metallargy and conventional casting techniques are avoided.

While large quantity production runs and certain part material characteristics might be most advantageously made using conventional fabrication techniques, the method and apparatus 10 of the present invention is useful in many contexts. In particular, prototype models and casting patterns are easily and inexpensively produced. For example, casting patterns are easily made for use in sand casting, lost wax casting, or other forming techniques. Further, where desired quantities are very small, such as with obsolete replacement parts, production of such replacement parts using the apparatus 10 of the present invention has many advantages. Finally, the use of the apparatus 10 may be useful where size of production facilities is a major constraint, such as on-ship or in outerspace.

I claim:

1. A method of producing a part from a powder, comprising the steps of:

depositing a first layer of the powder at a target surface;

directing energy at selected locations of said first layer of powder corresponding to a first cross-section of the part to fuse the powder threat, with unfused portions of the first layer of powder remaining in place;

depositing a second layer of powder over both fused and remaining unfused portions of said first layer of powder after said directing step, so that the second layer of powder is supported by fused and remaining unfused portions of said first layer of powder;

after the depositing step, heating the second layer of powder to a temperature below the sintering temperature of the powder, to moderate a temperature difference between the second layer of powder and fused portions of the first layer of powder therebeneath; and directing energy at selected locations of said second layer of powder corresponding to a second cross-section of the part to fuse the powder threat, and so that fused powder at one of said selected locations of said second layer of powder fuses to fused powder in said first layer.

2. The method of claim 1, wherein said step of directing energy at selected locations of said second layer of powder comprises:

directing a laser beam at selected locations of said second layer of powder to provide, in combination with the heating step, the heat of fusion of the powder.

3. The method of claim 1, wherein said heating step heats the powder at the target surface.

4. The method of claim 3, wherein said heating step comprises:

heating a gas; and directing the heated gas toward said target surface.

5. The method of claim 4, further comprising:

exhausting directed heated gas from said target surface.

6. The method of claim 5, wherein the exhausting of the directed heated gas is performed from below said target surface.

7. The method of claim 1, wherein said heating step is performed to moderate temperature differences in the sintered and unsintered powder.

8. The method of claim 1, wherein the depositing steps each comprise:

dispensing powder proximate said target surface; and after said providing step, moving a drum across said target surface;

during said moving step, rotating the drum counter to the direction of movement of said drum across said target surface; and contacting the powder with the counter-rotating drum as it moves across the target surface so that a layer of powder remains over said target surface after said moving step.

9. The method of claim 1, further comprising:

repeating the steps of depositing, heating, and directing for a plurality of layers following the second layer of powder.

* * * * *